Jan. 5, 1960    R. H. BRANDES ET AL    2,919,752
FLUID PRESSURE SYSTEM AND CONTROL
VALVE ASSEMBLY THEREFOR

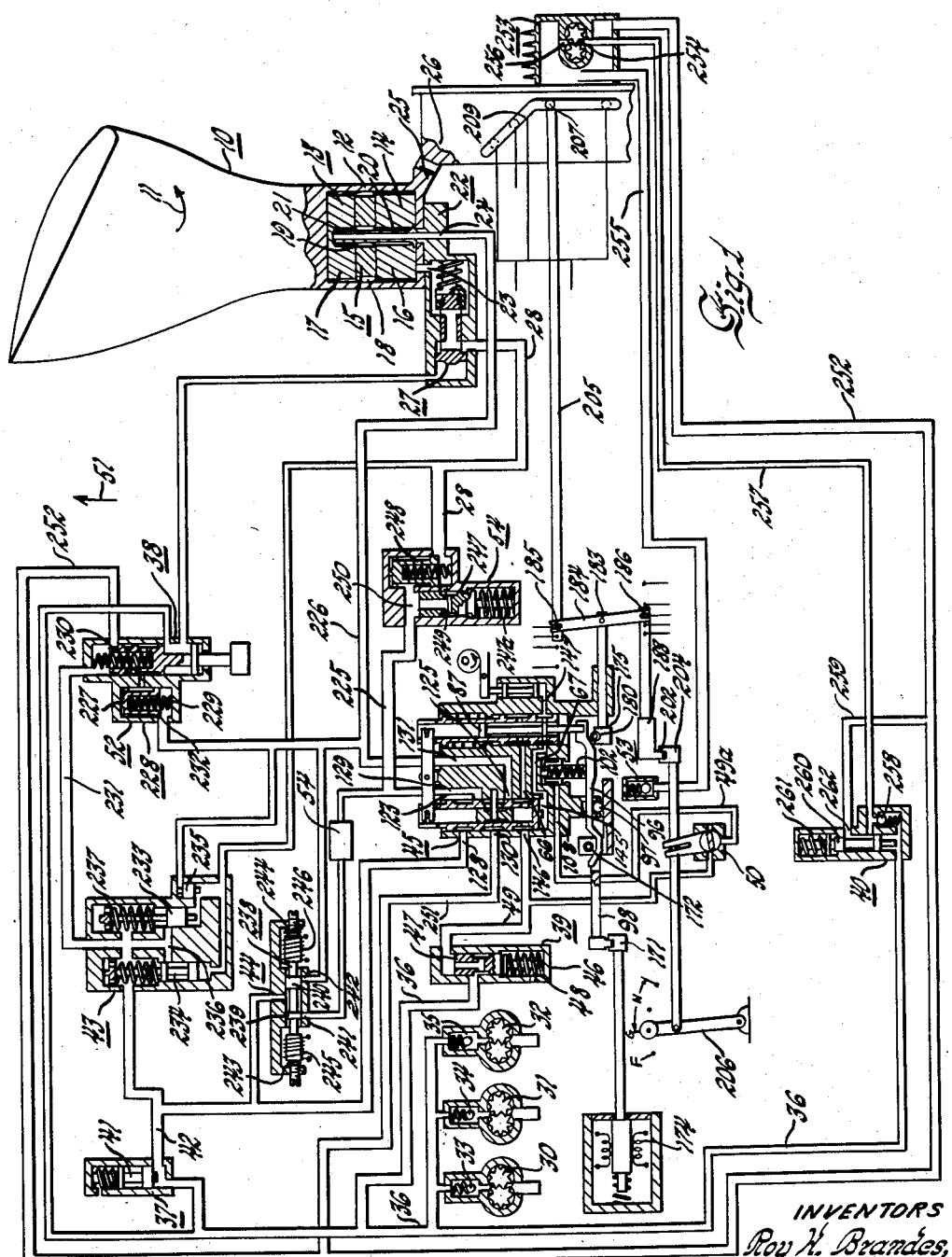

Filed Feb. 3, 1955    6 Sheets-Sheet 2

INVENTORS
Roy H. Brandes,
Richard A. Hirsch,
BY and Darrell E. Royer
Craig V. Morton
THEIR ATTORNEY Jan. 5, 1960

R. H. BRANDES ET AL
FLUID PRESSURE SYSTEM AND CONTROL
VALVE ASSEMBLY THEREFOR 2,919,752

Filed Feb. 3, 1955

INVENTORS
Roy H. Brandes,
Richard A. Hirsch,
BY and Darrell E. Royer
Craig V. Morton
THEIR ATTORNEY

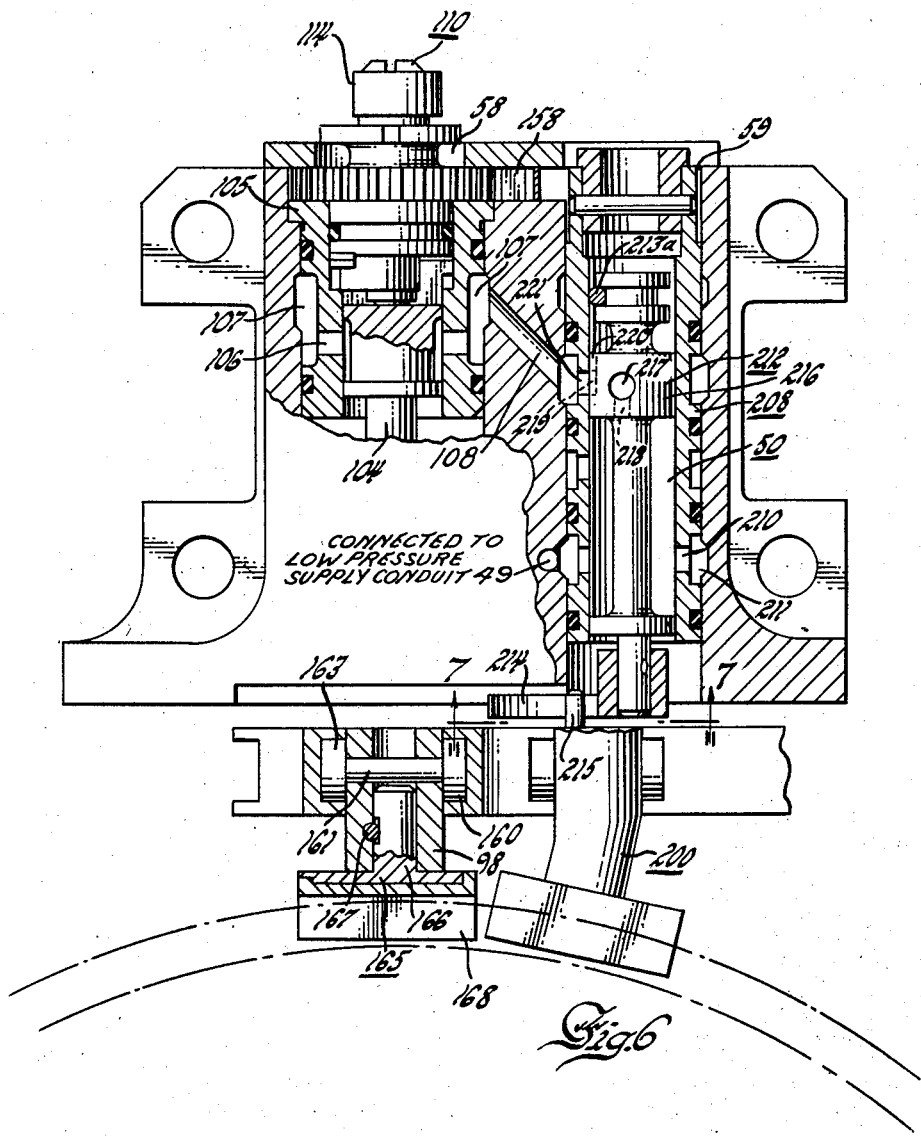

United States Patent Office

2,919,752
Patented Jan. 5, 1960

2,919,752

FLUID PRESSURE SYSTEM AND CONTROL VALVE ASSEMBLY THEREFOR

Roy H. Brandes, Dayton, Richard A. Hirsch, West Milton, and Darrell E. Royer, Vandalia, Ohio, assignors to General Motors Corporation, Detroit, Mich., a corporation of Delaware Application February 3, 1955, Serial No. 485,922

22 Claims. (Cl. 170—160.21)

This invention pertains to a fluid pressure system, and particularly to a control valve assembly for use in a fluid pressure system for controlling a variable pitch propeller.

In variable pitch propellers of the type wherein the pitch position of the propeller blades is controlled by a fluid pressure system including a source of fluid under pressure and servo-motor means for altering the pitch position of the propeller blades, it is desirable to control all pitch adjusting movement of the blades by a unitary valve assembly. This invention relates to a unitary control valve assembly for a fluid pressure system which may be adjusted to maintain propeller speed substantially constant, select any desired blade angle in the negative thrust range, and feather the propeller. Accordingly, among our objects are the provision of a fluid pressure system for a variable pitch propeller including a control valve assembly having means for maintaining propeller speed substantially constant; the further provision of a fluid pressure system including valve assembly of the aforesaid character including control means for manually controlling the pitch position of the propeller blades in the negative thrust range; the further provision of a control valve assembly including means for feathering the propeller; and the still further provision of a control valve assembly including means for jittering elements of the valve assembly to reduce static friction and maintain the requisite sensitivity of the valve assembly.

The aforementioned and other objects are accomplished in the present invention by controlling the flow of hydraulic fluid to and from the pitch adjusting servo-motor means through a servo actuated distributor valve. The fluid pressure system includes pressure developing means which are automatically operable, and constitute the source of fluid pressure for the system, during propeller rotation. The propeller assembly is of the type disclosed in copending application, Serial No. 485,921, filed of even date herewith in the name of Ditmer, et al., and comprises a hub having a plurality of radially extending blade sockets within which a plurality of propeller blades are journaled for rotation about their longitudinal axes to different pitch positions. Each propeller blade has associated therewith a torque unit, or servo-motor means, for adjusting the pitch position thereof, each torque unit comprising a cylinder having a reciprocable piston therein which divides the cylinder into an increase pitch chamber and a decrease pitch chamber. The cylinder is connected to the piston through helical splines whereby reciprocation of the piston will impart rotation to the cylinder, the cylinder, in turn, being connected to its respective propeller blade.

The blades of the propeller are subject to aero-dynamic and centrifugal twisting moments during propeller rotation which tend to move the propeller blades towards a low blade angle position in the negative thrust range. Accordingly, the fluid pressure control system is of the type wherein during constant speed operation of the propeller in the governing range, propeller pitch is maintained by pressurizing the increase pitch chambers so that the forces tending to reduce propeller pitch are in equilibrium with the forces tending to increase propeller pitch. In order to increase the pitch position of the propeller blades, the pressure in the increase pitch chambers of the torque units must be increased by supplying high pressure fluid thereto so as to produce a force which exceeds the force produced by the twisting moments which act in the opposite direction while the decrease pitch chambers are connected to drain. In order to decrease the pitch position of the propeller blades, the increase pitch chambers of the torque units are connected to drain, thereby relieving the pressure therein and permitting the external twisting moment forces to decrease the pitch position of the propeller blades, while the decrease pitch chambers are supplied with low pressure fluid to prevent voids therein.

Accordingly, the fluid pressure system includes a unitary control valve assembly which includes a pilot valve for controlling actuation of the servo distributor valve. The fluid pressure system also includes a pressure reducer valve which supplies constant low pressure fluid to the control valve assembly, which low pressure fluid may also be supplied to the decrease pitch chambers of the torque units so as to decrease the pitch position of the propeller blades when the propeller is stationary. The fluid pressure system also includes a pressure control valve assembly which maintains a predetermined pressure differential between the high pressure supply line and the increase pitch chambers of the torque units to assure sufficient pressure in the high pressure line to increase the pitch position of the propeller blades at all times and under all conditions.

The pilot valve of the unitary control valve assembly constitutes a component of a speed sensitive assembly including a reciprocable, centrifugally responsive valve plunger, a centrifugally responsive fulcrumed lever and an oppositely acting spring. One end of the lever is pivotally connected to one end of the valve plunger, and these parts are supported in a rotating propeller regulator such that centrifugal force tends to effect upward movement of the lever and the valve plunger about the lever fulcrum. The lever fulcrum is constituted by a roller, and upward movement of the lever and valve plunger is opposed by a spring which acts upon the lever between the fulcrum and its connection with the valve plunger. The resultant position of the valve plunger is determined by the sum of the moment of centrifugal force and the moment of spring force, the arrangement being such that at a predetermined speed of propeller rotation, the oppositely acting centrifugal and spring force moments will be in equilibrium.

The speed sensitive valve plunger is disposed within a follow-up sleeve, and controls the flow of low pressure fluid to and from a servo chamber for actuating the distributor valve. The distributor valve includes a fixed piston and a coaxial, reciprocable sleeve piston. The reciprocable sleeve piston has a pair of spaced valving lands for controlling the application of high pressure fluid to and from the increase pitch chambers of the torque units and the flow of low pressure fluid to and from the decrease pitch chambers of the torque units to thereby control the pitch position of the propeller blades. One servo chamber for the sleeve piston is formed between one end of the fixed piston and the closed end of the sleeve piston. This servo chamber is subjected at all times to constant low pressure fluid. A second servo chamber is formed between the closed end of the sleeve piston and the valve body. The second servo chamber is subjected to variable low pressure fluid as controlled by the speed sensitive valve assembly. By reason of the fact that the area of the sleeve piston exposed to the second servo chamber is substantially twice the area of the sleeve piston exposed to the first servo chamber, the position of the distributor valve piston may be accurately controlled by regulating the pressure in the second, or variable pressure, servo chamber.

The sleeve piston is interconnected with the follow-up sleeve of the speed sensitive valve assembly by a lever having an intermediate pivotal support on the valve body. The follow-up sleeve is spring biased so that in the absence of fluid pressure in the variable pressure servo chamber of the distributor valve, the sleeve piston of the distributor valve will be moved to a position calling for an increase in propeller pitch. The follow-up movement of the speed sensitive sleeve results in a pitch change rate proportional to the displacement of the speed sensitive valve plunger during constant speed propeller operation and, hence, results in a pitch change rate proportional to the speed error.

The body of the control valve assembly is formed with three parallel tracks, or ways, within which four carriages are slidably supported. One of the carriages supports a roller engageable with a cam surface on the fulcrumed lever, a second carriage is manually positionable through the propeller condition lever, and a third carriage is positioned by the propeller blades through a feedback mechanism which only operates in the low blade angle range. These three carriages are interconnected by a lever, opposite ends of which are connected to the condition lever positioned carriage, and the feedback positioned carriage, the intermediate portion of the lever being connected to the carriage which supports the roller. In order to assure engagement of the cam surface on the fulcrumed lever with the center carriage supported roller, the load on the spring is increased by a servo actuated piston when the condition lever is moved to a position in the blade angle control range. By increasing the force of the spring, the speed setting of the speed sensitive valve assembly is increased above the speed setting of this valve assembly during constant speed operation. However, the speed sensitive valve assembly will nevertheless prevent undesirable overspeeding of the propeller throughout the entire negative thrust range of selective blade angle control.

When the condition lever is moved to the feathered position, the speed sensitive lever is cammed upwardly by the carriage supported roller so as to call for an increase in propeller pitch. In this manner, the propeller blades will be moved to the feathered position, as determined by engagement of the torque unit pistons with one of the ends of the torque unit cylinders. A fourth carriage is slidably supported in the intermediate track of the valve body. This carriage also supports a roller which is engageable with a second cam surface on the speed sensitive lever. This carriage is known as the automatic feather carriage and is actuated by a solenoid which is energized whenever the propeller drives the engine, or, in other words, upon a negative torque signal. When the propeller drives the engine, the solenoid is energized and effects linear movement of the automatic feather carriage which cams the speed sensitive lever and the speed sensitive valve plunger upwardly so as to call for an increase in propeller pitch which will result in movement of the propeller blades to the feathered position.

The distributor valve sleeve piston is hydraulically jittered by varying the pressure in the variable pressure servo chamber. The means for varying this pressure during every revolution of the propeller comprises a cam actuated reciprocable plunger disposed in a cylinder which is hydraulically connected with the variable pressure servo chamber of the distributor valve. In addition, the speed sensitive lever and the speed sensitive valve plunger are mechanically jittered during propeller rotation by effecting a slight rolling movement of the fulcrum roller for the speed sensitive lever. This is accomplished by supporting the roller on the automatic feather carriage which is reciprocated during propeller rotation. When the propeller is operating in the negative thrust range wherein the position of the speed sensitive lever is controlled by the condition lever positioned carriage, and, hence, the condition carriage has imparted thereto a slight reciprocating motion during propeller rotation.

Further objects and advantages of the present invention will be apparent from the following description, reference being had to the accompanying drawings wherein preferred embodiments of the present invention are clearly shown.

In the drawings:

Fig. 1 is a schematic view illustrating the component parts of the fluid pressure control system.

Fig. 6 is a fragmentary view, partly in section and partly in elevation, taken along line 6—6 of Fig. 2, together with cooperating parts of the propeller regulator indicated by phantom lines.

Figure 7:
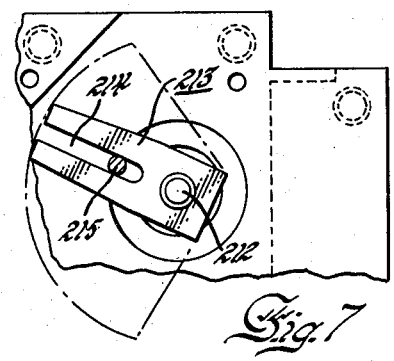
Fig. 7 is a fragmentary view, partly in section and partly in elevation, taken along line 7—7 of Fig. 6.

With particular reference to Fig. 1, the fluid pressure control system is shown in conjunction with a variable pitch propeller, which is schematically shown as including a blade 10 which is rotatable about its longitudinal axis to different pitch positions. The arrow 11 indicates the direction of blade rotation when the pitch of the propeller blade is increased towards the feathered position. The blade 10 is shown as having a hollow root portion 12 within which a torque unit, or servo-motor means, 13 are disposed. The servo-motor means 13 are schematically illustrated as comprising a cylinder which is integral with the hollow shank 12 and is formed with internally helical spline teeth 14. A reciprocable piston 15 is disposed within the cylinder and divides the cylinder into an increase pitch chamber 16 and a decrease pitch chamber 17. The piston 15 is shown with opposed surfaces of equal area, and has a set of helical spline teeth 18, which engage the helical spline teeth 14, as well as a set of helical spline teeth 19, which engage a set of helical spline teeth 20 whcih are formed on a member 21, shown integral with a propeller hub 22. The increase pitch chamber 16 is shown connected to a hub passage 23 and the decrease pitch chamber 17 is shown connected to a hub passage 24. Structurally, the torque unit 13 is of the type shown in the aforementioned copending application, Serial No. 485,921, filed of even date herewith, and suffice it here to say that upon upward movement of the piston 15, as viewed in Fig. 1, the propeller blade 10 will be rotated in the direction of arrow 11. The propeller blade 10 is subjected to external aerodynamic and centrifugal twisting moments during propeller rotation which tend to rotate the blade 10 in the decrease pitch direction, or a direction opposite to that of arrow 11. During propeller rotation, the twisting moment forces tend to decrease propeller blade pitch whenever the pitch position of the blades is between —3° and the feathered position.

In order to increase propeller pitch, hydraulic fluid under pressure is supplied through the hub passage 23 to the increase pitch chamber 16, while the decrease pitch chamber 17 is connected to drain through hub passage 24. In this manner, the forces tending to urge the piston 15 upwardly exceed the forces tending to urge the piston downwardly, thereby effecting rotation of the blade in the direction of arrow 11. In order to decrease propeller pitch during propeller rotation in the governing range between +5.8° and +55.8° blade angle, it is only necessary to connect the increase pitch chamber 16 to drain so as to relieve the pressure therein, low pressure fluid being supplied to the decrease pitch chamber to prevent voids therein while the external twisting moments rotate the blade 10 about is axis in a direction opposite to that of arrow 11, which will effect downward movement of the piston 15. When the propeller is stationary, or the blades are at a pitch position below −3°, the low pressure fluid supplied to the decrease pitch chambers is utilized to effect downward movement of the piston 15 since the blades are not subject to external twisting moments. In order to maintain the propeller blade 10 at any given angle between −3° and feathered, the pressure in increase pitch chamber 16 must result in a force which is equal to the oppositely acting force produced by the external twisting moments.

The propeller blade 10 is shown as having a bevel type blade gear 25, which meshes with a bevel type master gear 26 which is journaled for rotation relative to the propeller hub. The master gear 26 coordinates movement of all of the blade gears during pitch shifting movements of the propeller blades in a manner well known in the art. A pitch lock valve 27 is carried by the hub 22 and is interposed between the increase pitch passage 23 and an increase pitch line 28. The pitch lock valve 27 is of the type disclosed and claimed in copending application, Serial No. 276,836, filed March 15, 1952, in the name of Miller, et al., and constitutes no part of this invention. Suffice it to say that upon failure of the fluid pressure system, the pitch lock valve 27 blocks communication between passage 23 and line 28, thereby trapping hydraulic fluid in the increase pitch chamber 16 so as to prevent movement of the blades in the decrease pitch direction due to the external twisting moment forces whereby the pitch position of the propeller blades will remain fixed.

The component parts of the fluid pressure system depicted in Fig. 1 to the left of the pitch lock valve 27 are disposed within a regulator which is rotatable with the propeller, as shown in the aforementioned copending application, Serial No. 485,921. The fluid pressure system includes three gear type pumps 30, 31 and 32 having inlets which communicate with the reservoir for hydraulic fluid in the rotatable regulator. The gear type pumps are automatically driven upon rotation of the propeller and the regulator and supply fluid under pressure through one-way check valves 33, 34 and 35, respectively, to a high pressure line 36. The high pressure line communicates with a minimum pressure valve 37, a pitch lock control valve 38, a pressure reducer valve 39 and a feathering pump control valve 40. The minimum pressure valve 37 merely comprises a spring biased check valve plunger 41, which connects line 36 with line 42 when the pressure in line 36 exceeds 400 p.s.i. At the design speed of the propeller, namely 1105 r.p.m., the pressure produced by the pumps 30 through 32 is approximately 3600 p.s.i. The line 42 communicates with a pressure control valve assembly 43, a solenoid actuated valve 44 and a governor, or control, valve assembly 45. The solenoid valve is controlled by an electronic circuit of the type disclosed in copending application Serial No. 405,154, filed January 20, 1954, in the name of Kessler, et al., and, per se, constitutes no part of this invention.

The pressure reducer valve 39 comprises a casing 46 having disposed therein a throttle valve 47, which is urged upwardly by a spring 48. The spring 48 is calibrated so that the pressure in the outlet line 49 of the pressure reducer valve 39 is maintained at a constant potential of 400 p.s.i. The low pressure line 49 communicates with the control valve assembly 45 and a rotary selector valve 50.

During propeller rotation, the component valves of the fluid pressure system are subjected to centrifugal force in the direction of arrow 51 in Fig. 1. In other words, all valve assemblies including elements movable vertically in Fig. 1 are mounted radially within the regulator so as to be responsive to centrifugal force. The only valve in the regulator which is not responsive to the thrust of centrifugal force, as indicated by the arrow 51, is the solenoid actuated valve 44. The fluid pressure system also includes a decrease pitch supply valve 52, a restrictor valve 53 and two pressure compensating valve assemblies 54 of identical construction. The pressure compensating valve assemblies 54 and the pressure control valve assembly 43 are of the type disclosed in copending application, Serial No. 259,252, filed November 30, 1951, in the name of Dale W. Miller. The pitch lock control valve 38 is of the type shown in the aforementioned copending application, Serial No. 276,836, and constitutes no part of this invention.

Figure 2:
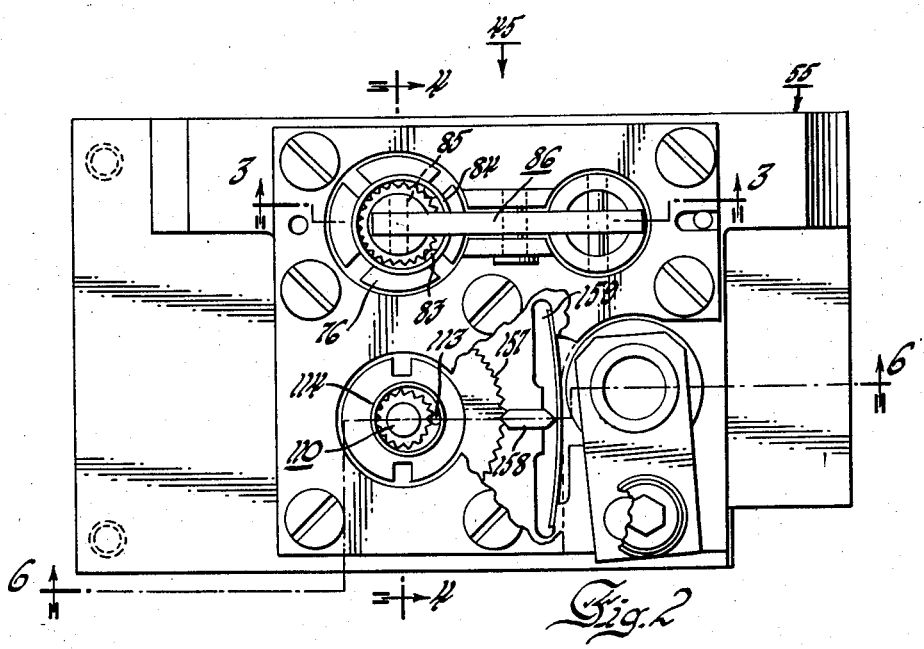
Fig. 2 is a fragmentary top view, in elevation, of the control valve assembly.
Figure 3:
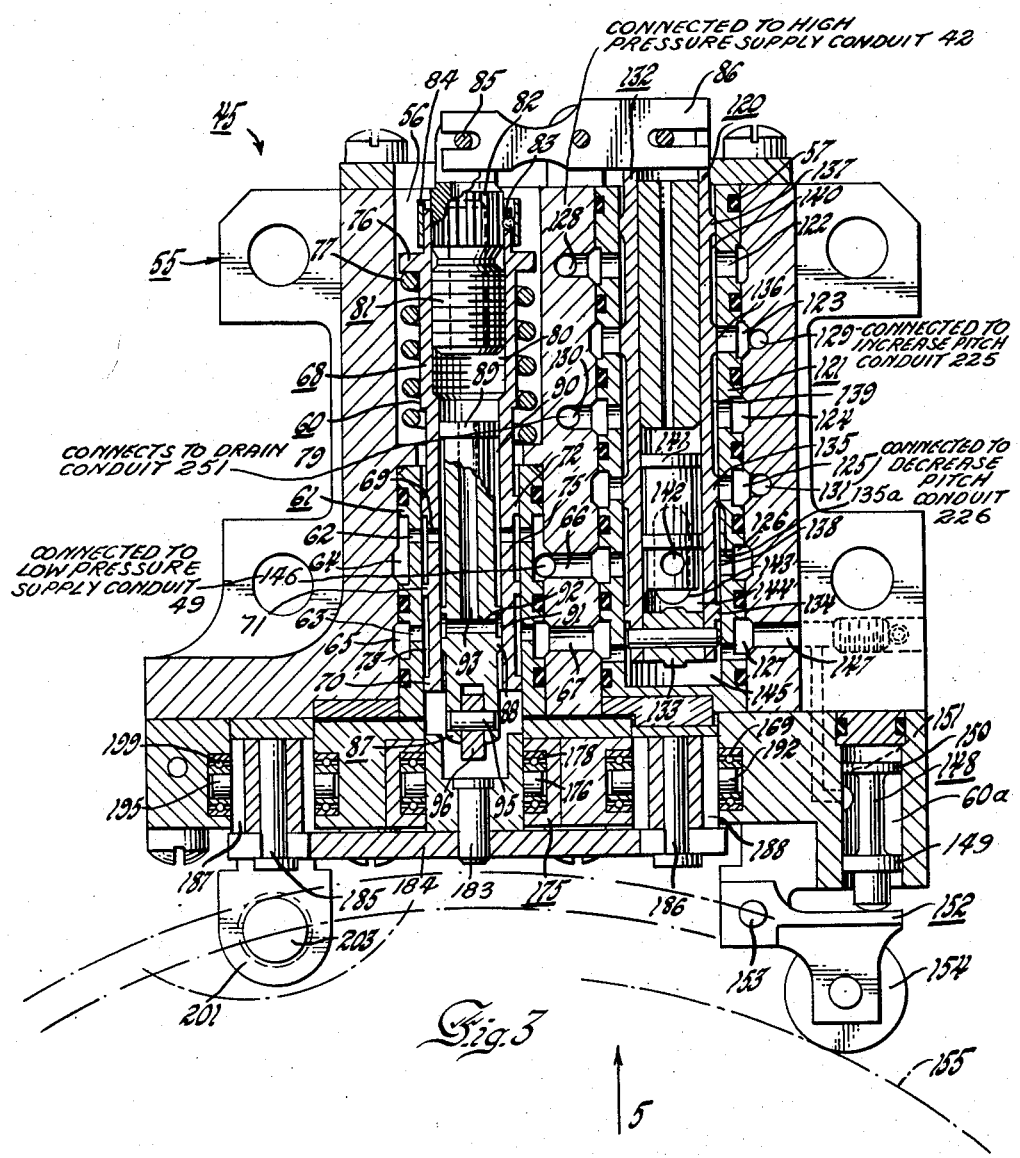
Fig. 3 is a view, partly in section and partly in elevation, taken along line 3—3 of Fig. 2, together with cooperating parts of the propeller regulator indicated by phantom lines.
Figure 4:
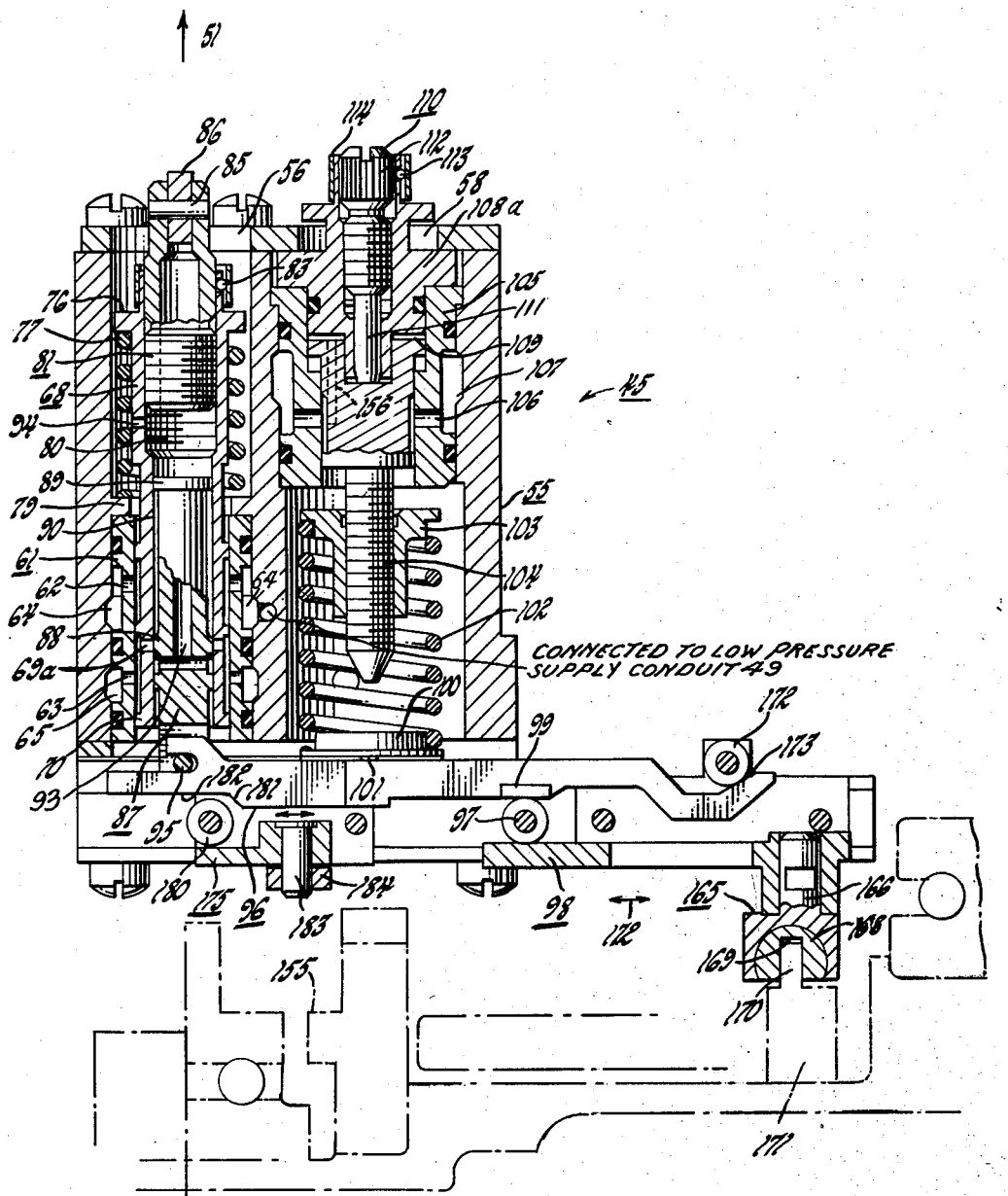
Fig. 4 is a view, partly in section and partly in elevation, taken along line 4—4 of Fig. 2, together with cooperating parts of the propeller regulator indicated by phantom lines.

With reference to Figs. 1 through 7, the construction of the control valve assembly 45 will be described. The control valve assembly 45 includes a valve body 55, which is mounted in a propeller regulator in the manner shown in the aforementioned copending application, Serial No. 485,921, filed of even date herewith. The valve body 55 is formed with five vertical bores 56, 57, 58, 59 and 60a, as shown in Figs. 3, 4, and 6. A speed sensitive valve assembly 60 is disposed within valve bore 56 and comprises a stationary porting cylinder 61 having a set of circumferentially spaced ports 62 and a set of circumferentially spaced ports 63. The set of ports 62 communicate with an annular groove 64 in the valve body, which connects with a passage 66. The set of ports 63 communicate with an annular groove 65 in the valve body which connects with a passage 67. The speed sensitive valve assembly 60 also includes a reciprocable porting sleeve 68 having a set of circumferentially spaced ports 69 and a set of circumferentially spaced ports 69a. The valve sleeve 68 is formed with three axially spaced lands 70, 71 and 72, which sealingly engage the stationary cylinder 61. An annular groove 73 is formed between lands 70 and 71 and an annular groove 75 is formed between lands 71 and 72. The annular groove 73 communicates at all times with the set of ports 63 in the stationary cylinder 61, and the annular groove 75 communicates at all times with the set of ports 62 in the stationary cylinder 61.

The follow up porting sleeve 68 includes a flanged portion 76 against which one end of a compression spring 77 seats. The other end of the compression spring 77 engages an internal shoulder 79, which projects into the valve bore 56. The spring 77 biases the sleeve 68 upwardly, as viewed in Figs. 3 and 4.

A portion of the valve sleeve 68 is threaded, as indicated by numeral 80, the threaded portion receiving an adjustable stud 81 having a longitudinally serrated end portion 82. The longitudinal serrations on the end portion 82 are engaged by a ball 83, which is received in an opening in the valve sleeve 68. The detent ball 83 is maintained in engagement with the serrated portion 82 by means of an annular spring member 84. The stud 81 is connected by means of a cross pin 85 to one end of a lever 86, the end of the lever connected with the stud 81 being disposed within a diametral slot formed therein.

A reciprocable valve plunger 87 is disposed within the reciprocable valve sleeve 68. The valve plunger 87 is formed with a pair of axially spaced lands 88 and 89, the lands 88 and 89 sealingly engaging the bore of the sleeve 68 and forming therebetween an annular groove 90. The annular groove 90 communicates at all times with the set of ports 69 in the valve sleeve 68. The land 88 is formed with an annular groove 91, which communicates with a transverse passage 92 through the plunger 87. The transverse passage 92 connects with an axially extending passage 93 in the plunger 87, passage 93 communicating with the interior of the sleeve 68 through which oil may flow to drain through hollow stud 81.

The upper edge of land 88 cooperates with the set of ports 69a in the valve sleeve 68, as shown in Fig. 4. Upward movement of the valve plunger 87 relative to the sleeve 68, as viewed in Fig. 4, will result in connecting ports 69a with drain passages 92 and 93. Downward movement of the plunger 87 relative to the sleeve 68, as viewed in Fig. 4, will result in connecting port 69a to the annular channel 90 between plunger lands 88 and 89.

The plunger 87 responds to centrifugal force in the direction of arrow 51 in Figs. 3 and 4, and, thus, constitutes a part of the speed sensing means. The lower end of the valve plunger 87 is pivotally connected by a cross pin 95 to one end of a centrifugally responsive lever 96, as shown in Fig. 4. The lever 96 is supported for pivotal movement about a fulcrum roller 97, which engages an automatic feather carriage 98, which will be described hereinafter. The lever 96 is formed with a hardened surface 99, which engages the fulcrum roller 97. A spring seat 100 having an axially extending pin 101, which is received in a recess in the lever 96, transmits the force of a compression spring 102 to the lever 96 between the fulcrum roller 97 and the connection of the lever 96 with the centrifugally responsive plunger 87. During propeller rotation, the centrifugal force acting on the plunger 87 and the lever 96 is balanced against the force of the governor spring 102 about the fulcrum roller 97. The resultant position of the plunger 87 is determined by the sum of the moment of centrifugal force and the moment of spring force.

One end of the spring 102 engages spring seat 100 and the other end thereof engages the spring seat 103, which comprises a nut having threaded engagement with a stud 104. The nut 103 is keyed to the valve body. The governor spring assembly is disposed within bore 58 of the valve body and comprises a stationary cylinder member 105 having a set of circumferential ports 106 which communicate with an annular groove 107. Annular groove 107 communicates with a passage 108 in the valve body, as seen in Fig. 6. The stud 104 constitutes a reciprocable piston capable of fluid pressure actuation downwardly, as viewed in Fig. 4. The upper end of the cylinder 105 is closed by a plug 108a which is keyed to stud 104, and constitutes the end wall of a servo chamber 109 to which fluid pressure may be applied so as to effect downward movement of the stud 104 so as to reset the governor spring 102 by increasing the loading thereof. The plug 108a has a serrated periphery 157 which is engaged by a detent 158 that is loaded by spring 159, the detent 158 preventing rotation of the plug 108 relative to the valve body. The load on the governor spring 102 is initially set by adjusting the nut 103 relative to the stud 104. This adjustment is internal and can be altered after the control valve 45 is assembled. Thereafter, the loading of spring 102 can be adjusted manually by rotation of a stud 110, which threadedly engages the plug 108 and has a projecting portion 111, which engages the piston surface of the stud 104. The stud 110 is formed with a longitudinally serrated portion 112 and is held in adjusted position by a detent ball 113, which is received in an opening in the plug 108 and maintained in engagement with the serrated portion 112 by an annular spring 114, as seen in Figs. 2 and 4.

A distributor valve assembly 120 is disposed within valve bore 57. The distributor valve assembly includes a stationary porting cylinder 121 having six sets of circumferentially spaced ports 122 through 127. The set of ports 122 connects with a valve body passage 128; the set of ports 123 communicates with the valve body passage 129; the set of ports 124 communicates with a valve body passage 130; the set of ports 125 communicates with a valve body passage 131; the set of ports 126 communicates with valve body passages 66 and 146; and the set of ports 127 communicates with the valve body passages 67 and 147. A reciprocable sleeve piston 132 is disposed within the porting cylinder 121. The lower end of the sleeve piston 132 is closed by a plug 133, the sleeve piston 132 having spaced lands 134 through 137, which sealingly engage the porting cylinder 121. An annular groove 138 is formed between lands 134 and 135; an annular groove 139 is formed between lands 135 and 136; and an annular groove 140 is formed between lands 136 and 137. Annular groove 138 communicates at all times with ports 126, annular groove 139 communicates at all times with ports 124, an annular groove 140 communicates at all times with ports 122. The land 136 controls the opening of ports 129 to either groove 139 or 140. The land 135 controls the opening of ports 125 to either groove 139 or 138.

A fixed piston 141 is disposed within the sleeve piston 132. The piston 141 is connected to the valve sleeve 121 by a cross pin 142, which extends through a sidewall opening 143 in the sleeve piston 132. A servo chamber 144 is formed between the lower end of the fixed piston 141 and the upper surface of plug 133. A second servo chamber 145 is formed between the lower surface of sleeve piston 132 and the closed end of the porting cylinder 121. The area of the sleeve piston exposed to the servo chamber 145 is substantially twice the area of the plug 133 exposed to the servo chamber 144. The servo chamber 144 is connected through the opening 143 to the annular groove 138 and, hence, the ports 126 and the passage 66 at all times.

The servo chamber 145 is at all times connected to ports 127 in the porting cylinder 121, the ports 127 being connected with a valve body passage 147 and 67, the passage 147 opening into the bore 60a. A reciprocable plunger 148 is disposed within the bore 60a, the plunger having a pair of spaced lands 149 and 150. The land 150 is formed with an opening 151 therethrough, while the land 149 sealingly engages the sidewalls of the bore 60a. The lower end of the plunger 148 engages a lever 152 which is pivotally supported by a pin 153 on the valve body. The lever carries a roller 154 which engages a stationary cam surface 155 in the regulator as indicated by phantom lines in Figs. 3 and 4. During rotation of the propeller, the governor valve body will rotate around the surface 155, which is disposed within the propeller regulator so as to impart pivotal movement to the lever 152 which will, in turn, impart reciprocating movement to the plunger 148. Reciprocation of the plunger 148 will vary the pressure of the fluid in bore 60a, which will be communicated through passage 147 and ports 127 to the servo chamber 145. In this manner, the pulsations of the jitter plunger 148 raise and lower the pressure in servo chamber 145 during each revolution of the propeller so as to cause a slight jittering, or reciprocating, movement of the sleeve piston 132 during propeller rotation.

Figure 5:
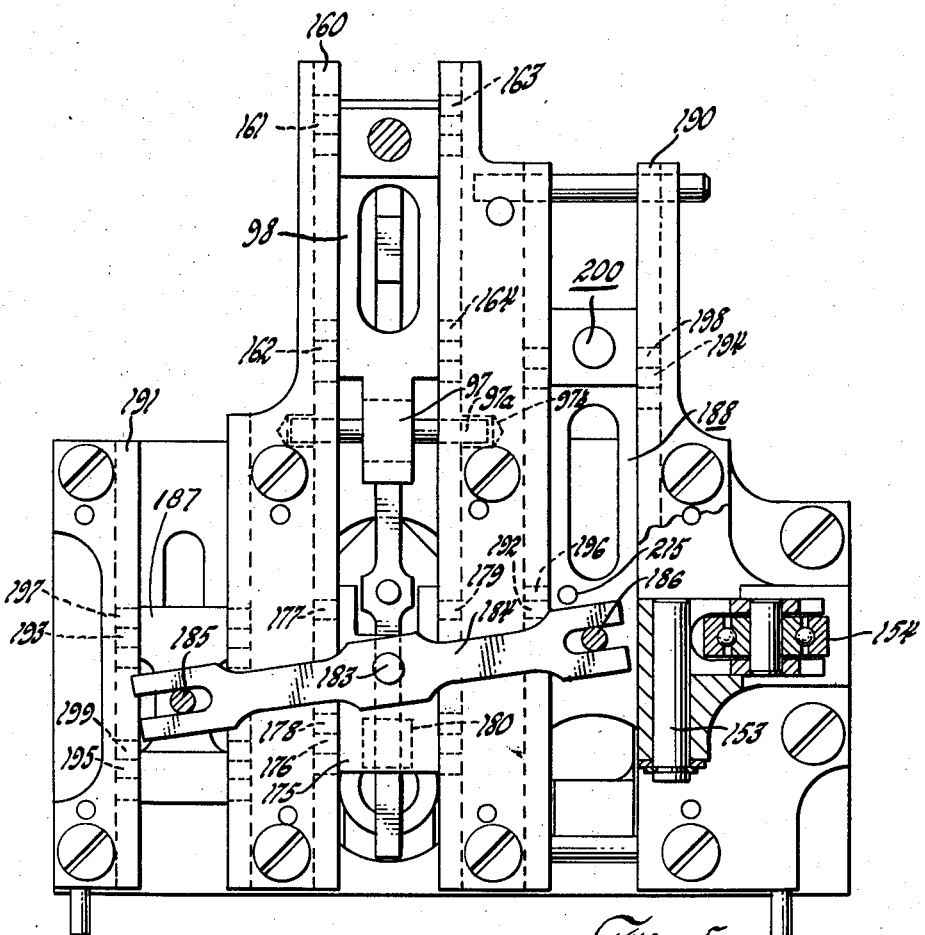
Fig. 5 is a view, partly in section and partly in elevation, taken in the direction of arrow 5 of Fig. 3.

With particular reference to Figs. 4 through 6, the automatic feather carriage 98 is supported for reciprocable movement in a track, or way, 160 of the valve body 55 by means of a pair of spaced transversely extending pins 161 and 162 which are supported by ball bearing assemblies 163 and 164, respectively. One end of the carriage 98 is drivingly connected to a shoe assembly 165 comprising a shank portion 166 which is retained in a bore of the carriage 98 by means of a cross pin 167, and a partially cylindrical element 168 having a groove 169. The partially cylindrical element 168 is capable of angular movement within the shank 166, and the slot 169 thereof is adapted to receive a tang 170 of an axially movable control ring 171 disposed within the propeller regulator and indicated in phantom lines in Fig. 4. The partially cylindrical shoe element 168 is self-centering and will correct for any misalignment in the propeller assembly by virtue of the fact that the element 168 can rotate relative to the shank 166. The tang 170 is formed with a slight eccentricity in an axial direction so that during rotation of the control valve assembly 45 about the stationary ring 171, a slight reciprocating movement will be imparted to the carriage 98 in the directions indicated by arrows 172 in Fig. 4. This slight reciprocation of the carriage 98 will effect mechanical jittering of the governor lever 96 and the speed sensitive plunger 87 by effecting slight reciprocation of the fulcrum roller 97. As depicted in Fig. 5, the roller 97 is carried by a pin 97a. The ends of the pin 97a are received in enlarged openings 97b in the valve body which permit slight reciprocation of the fulcrum roller pin 97a during propeller rotation. In other words, the fulcrum roller 97 rolls toward and away from the centerline of the governor spring 102, which motion changes the lever ratio and causes the speed sensitive plunger 87 to pulsate, thereby causing a periodic increase and decrease in the pressure in servo chamber 145 so that it will effect jittering movement of the sleeve piston 132. The mechanical jittering of the speed sensitive plunger 87, as effected by the automatic feather carriage 98 is in phase with the hydraulic jitter effected by the jitter plunger 148.

The automatic feather carriage 98 also carries a roller 172, which cooperates with a cam surface 173 on the governor lever 96. When the automatic feather carriage 98 is moved to the right, as viewed in Fig. 4, to the left, as viewed in Fig. 1, the roller 172 will engage the cam surface 173 and effect clockwise movement of the lever 96 about fulcrum 97, as viewed in Fig. 4, counterclockwise movement of the lever 96 about fulcrum 97, as viewed in Fig. 1, thereby moving the valve plunger 87 upwardly. When valve plunger 87 is moved upwardly, the servo chamber 145 is connected to drain through passage 62, annular groove 65, ports 63, annular groove 73, ports 69a (Fig. 4), passage 93, the hollow stud 81 and to the regulator, and the constant pressure in servo chamber 138 will effect downward movement of the distributor valve sleeve piston 132 whereupon high pressure fluid will be applied to the increase pitch chambers of the torque units from passage 128, ports 122, annular groove 140, ports 123, passages 129 and 225, through check valve 248 to line 28 and through valve 27 and port 23, so as to move the propeller blades to the feathered position. Movement of the control ring 171 to the right in Fig. 4, to the left in Fig. 1, is effected by a solenoid 174, the windings of which are automatically energized from a suitable electric power source, not shown, whenever the propeller drives the engine and irrespective of the pitch position of the propeller.

The track 160 in the valve body also slidably supports a second carriage 175, as viewed in Figs. 3, 4 and 5, carriage 175 being slidably supported by pin 176 and bosses 177 and 179, pin 176 carrying a roller bearing assembly 178. The carriage 175 supports a roller 180, which cooperates with a second cam surface 181 formed on the lever 96. When the propeller is operating in the governing range and the propeller blades are at an angle above +6°, the roller 180 does not engage the cam surface 181. At this time, the roller 180 is disposed below surface 182 of the lever 96 and merely constitutes a stop for limiting downward movement of the plunger 87 and the lever 96 under the urge of spring 102. When the surface 182 of the lever 96 engages the roller 180, the position of the sleeve 68 may be adjusted by means of the stud 81 so as to adjust the maximum rate of decrease pitch movement which may be effected by the control valve assembly 45. Preferably, the rate of decrease pitch change is limited to 10° per second while the increase pitch change rate of the valve assembly 45 may be on the order of 18° per second.

The carriage 175 is connected by a pin 183 to the intermediate point of a lever 184. With particular reference to Figs. 1, 3 and 5, both ends of the lever 184 are bifurcated and receive pins 185 and 186, respectively. Pin 185 is supported by a feedback carriage 187, and pin 186 is supported by a condition carriage 188. The feedback carriage 187 is supported for sliding movement in a track, or way, 191 in the valve body, the carriage 187 having a pair of transversely extending pins 193 and 195, which are supported by ball bearing assemblies 197 and 199, respectively. The carriage 187 includes a tang portion 201 having a threaded opening 203, which receives a high lead screw, not shown. The high lead screw constitutes part of the rotary feedback mechanism of the type shown in copending application, Serial No. 289,110, filed May 21, 1952, in the name of Richard A. Hirsch. This feedback mechanism is shown schematically in Fig. 1 as comprising an axially movable rod 205, one end of which carries the pin 185 and the other end of which supports a cam follower 207, which rides in a cam slot 209 formed in the master gear 26. Axial movement is only imparted to the rod 205 when the follower 207 is positioned in the inclined surface of the slot 209, which occurs only when the propeller blades are at an angle between the maximum negative angle of −14.5° and +16.8°.

The condition carriage 188 is likewise supported for sliding movement within a track, or way, 190 in the valve body. The condition carriage 188 includes a pair of transversely extending pins 192 and 194 which are supported by ball bearing assemblies 196 and 198, respectively. The condition carriage 188 is positioned through a self-centering shoe assembly 200, which is constructed in the manner heretofore described in conjunction with the shoe assembly of the automatic feather carriage 98. The shoe assembly 200 receives a tang 202 formed on a nonrotatable, axially movable control ring 204 disposed within the propeller regulator, as seen in Fig. 1. The control ring 204 is manually positioned by a pilot's condition lever 206, which has a feathering position denoted by the letter F, a governing position denoted by the letter G, and a blade angle control range indicated by the arc identified by the letter N.

When the pilot's condition lever 206 is moved in a counterclockwise direction, as viewed in Fig. 1, to the manual feathering position denoted by letter F, the condition ring 204 will be moved to the left, thereby imparting clockwise movement to the lever 184 about pin 185. This will result in movement of the condition carriage 175 to the left so that roller 180 engages cam surface 181 of the lever 96, thereby imparting upward movement to the valve plunger 87 whereupon the servo chamber 145 will be connected to drain; the sleeve piston 132 will be moved downwardly by the pressure in servo chamber 144 and high pressure fluid will be applied to the increase pitch chambers of the torque units.

Upon movement of the condition lever 206 into the negative thrust range, the rotary selector valve 50 will be operated. Schematically in Fig. 1, the rotary selector valve controls the application of low pressure fluid from line 49 to line 49a and the reset servo piston 104. As seen in Fig. 6, the rotary selector valve 50 is disposed in valve bore 59 and comprises a stationary porting sleeve 208 having a series of circumferentially spaced ports 210 which communicate with an annular groove 211. A rotary plunger 212 is supported within the sleeve 208 and restrained against axial movement by a pin 213a. The lower end of the rotary plunger 212 is connected to a crank arm 213, as viewed in Figs. 6 and 7, the crank arm 213 having a bifurcated portion 214, which receives a pin 215 carried by the condition carriage 188. When the condition carriage 188 is moved into the negative thrust range, the rotary selector valve piston is positioned so that line 49 is connected with line 49a, thereby applying a low pressure fluid to the servo chamber 109, which moves the piston 104 downwardly so as to increase the load on spring 102. By increasing the load on spring 102, the governor lever 96 will be maintained in engagement with the roller 180. Furthermore, by increasing the load on spring 102, the speed setting of the speed sensitive valve assembly will be increased so that the plunger 87 and the lever 96 will not move upwardly in response to centrifugal force until a speed in excess of the governing speed of the propeller is reached. However, the speed sensitive valve assembly will still be operative to prevent undesirable overspeeding of the propeller in the manual blade angle control range.

Structurally, the rotary valve plunger 212 includes a land 216 having a radial passage 217 which communicates with an axially extending passage 218. The passage 218 communicates with the space between the valve lands and the pressure inlet ports 210. The land 216 is formed with a second radial passage 219, which communicates with an axial passage 220, the passage 220 communicating with the open end of the sleeve 208. The radial passages 217 and 219 may be aligned with a port 221 in the sleeve 208, which communicates with valve body passage 108. Valve body passage 108 communicates with annular groove 107, which communicates through port 106 and internal passage 156 with the servo chamber 109. When the condition lever 206 is in either the feathering or governing position, the arcuate groove 219 communicates with the port 221 whereby the servo chamber 109 is connected to drain. However, when the condition lever 206 is moved into the negative thrust range, the piston 212 is rotated to a position wherein the passage 217 communicates with the port 221 and low pressure fluid is applied from the ports 210 to the servo chamber 109.

When the condition lever is in the blade angle control range, any blade angle between −14.5° and +16.8° may be selected and maintained by the pilot. When the condition lever is moved to a position in the blade angle control range, the pin 186 will position lever 184 and the carriage 175 so as to call for a particular angle within the aforementioned range. When this particular angle has been reached by the blades, the feedback rod 205 will reposition the lever 184 through the pin 185 and the carriage 175 so that the plunger 87 is in a neutral position and flow of fluid to and from the torque units is prevented. At this time, the speed setting of the governor valve assembly is 1200 r.p.m., while when the condition lever 206 is in the governing range, the speed setting of the governor valve assembly is 1105 propeller r.p.m.

The control valve assembly 45 is designed to operate with a pressure compensated system wherein the pitch position of the propeller blades is controlled by supplying or draining pressure fluid from the increase pitch chambers of the torque units, while low pressure fluid is made available for preventing voids in the decrease pitch chambers. Thus, the fluid pressure system depicted in Fig. 1 includes two pressure compensating valves 54, which, in accordance with the aforementioned copending application, Serial No. 259,252, control the maximum rate of decrease pitch change by maintaining a constant pressure in conduit section 225 when the increase pitch chambers are connected to drain through the distributor valve port 123. The system includes the decrease pitch supply valve 52, which constitutes a check valve comprising a plunger 227 disposed within a housing 228 and urged upwardly by means of a spring 229. The decrease pitch supply valve 52 includes an inlet port 230, which is connected to a surplus flow conduit 231 of the pressure control valve assembly 43. In addition, the valve assembly 52 includes an outlet port 232, which is connected to the decrease pitch line 226.

The pressure control valve assembly 43 includes an equal area valve 233, a pressure relief valve 234 and a shuttle valve 235. Opposite chambers of the shuttle valve 235 are connected to the increase and decrease pitch lines 225 and 226, respectively, whereby the higher of the pressures existent in lines 225 and 226 is communicated to the chamber beneath the equal area valve 233, as depicted in Fig. 1. The equal area valve 233 controls a throttle port 236, which is connected to the surplus flow conduit 231. The function of the equal area valve 233 is to maintain a pressure in line 42 equal to the higher of the pressure potentials in either lines 225 and 226 plus the force of spring 237 which biases the valve 233 upwardly and the thrust of centrifugal force acting on the valve plunger. The opposed surfaces of the throttling land which cooperate with port 236 of the valve 233 are of equal area.

The solenoid valve 44 includes a reciprocable spool valve 238 having a pair of spaced lands 239 and 240 which cooperate with a pair of spaced control ports 241 and 242, respectively. The spool valve 238 is normally centered by a pair of oppositely acting springs 243 and 244, movement of the spool valve 238 to the left being effected by energization of solenoid winding 245 and movement of the spool valve 238 to the right being effected by energization of solenoid winding 246, as depicted in Fig. 1. As stated hereinbefore, energization of the solenoid windings 245 and 246 is controlled by an electronic governor, not shown, of the type disclosed in copending application, Serial No. 405,154, which governor can only be rendered operative when the condition lever 206 is positioned for constant speed propeller operation in the governing range, as depicted in Fig. 1. The solenoid valve 44 has a maximum increase pitch change rate of 3° per second by connecting port 241 with line 42. When the spool valve 238 moves to the right, as viewed in Fig. 1, port 241 is connected to drain, while port 242 remains blocked by land 238. Thus, high pressure fluid from line 42 is never supplied to the decrease pitch line 226 by the solenoid valve 44. When the spool valve 238 moves to the left, as depicted in Fig. 1, port 242 is connected to drain while port 241 is connected to line 42, thereby applying high pressure fluid to the increase pitch line 225.

The pressure compensating valves 54 are of identical construction and, hence, only one is shown in detail, and comprises a throttling valve 247 biased by a spring 247a, and a spring biased check valve 248. During flow of pressure fluid from the control valve assembly 45 to the increase pitch chambers of the torque units, the check valve 248 opens to permit unrestricted fluid flow. However, during flow of fluid from the increase pitch chambers of the torque units to the control valve assembly 45, the check valve 248 will close whereupon the drain flow must pass through the throttling port 249 of the throttle valve 247, which results in the maintenance of a constant pressure in chamber 250 of the valve assembly 54, and thus restricts drain flow from the increase pitch chambers to control the maximum decrease pitch change rate. A constant pressure is maintained in chamber 250 of the valve assembly 54 since the governor valve ports 123, which are connected to drain constitute a restricted orifice whereby pressure is built up in line 225 and chamber 250. At this time, the throttling valve 247, which has a surface exposed to the chamber 250, controls the port 249 so as to maintain the pressure in 250 substantially constant to control the rate of movement of the propeller blades in the decrease pitch direction. In other words, the ports 123 of the governor valve assembly constitute restricted orifice means across which a constant pressure drop is maintained.

All of the drain flow from the distributor valve assembly 120 flows into line 251, while the surplus flow conduit 231 is connected to drain line 252. Line 251 is connected with line 252 and line 252 is connected to a heat exchange reservoir 253, which is mounted in front of the propeller hub and rotates therewith. The construction of the heat exchange reservoir 253 is described and claimed in aforementioned copending application, Serial No. 485,921, and suffice is here to say that an electric motor driven feathering pump 254 is disposed within the reservoir 253. The drain flow from line 252 passes through the reservoir where it is cooled and into a return line 255, which is connected to the regulator reservoir through the restrictor valve 53, which merely comprises a spring biased check valve that maintains a predetermined presure in the line 255 and the reservoir 253. The electric motor driven feathering pump 254 includes an inlet passage 256 which communicates with the reservoir 253, the outlet of pump 254 being connected to line 257 which communicates with the feathering pump control valve 40.

The feathering pump control valve 40 comprises a check valve 258 which prevents flow of fluid from line 36 to line 257, while permitting flow in the opposite direction. The electric motor driven feathering pump 254 may be energized by any suitable switch means, not shown, when the condition lever 206 is moved to the feathered position, as denoted by letter F. When the pressure potential in line 36 exceeds that in line 257, the flow produced by pump 254 is bypassed from line 257 to line 259, which is connected to the drain line 252. The bypass of the flow produced by the feathering pump 254 is controlled by a plunger valve 260, which is biased downwardly by a spring 261. The output pressure of the feathering pump 254 is approximately 400 p.s.i. and when the pressure in line 36, which acts upon valve plunger 260 exceeds 400 p.s.i., the plunger 260 will be positioned, as depicted in Fig. 1. However, when the pressure in line 36 is below 400 p.s.i., the spring 261 will move the plunger 260 downwardly so as to block bypass port 262 whereupon the presure in line 257 will flow through check valve 258 and into line 36. The feathering pump control valve 40 is of the type disclosed in Patent No. 2,626,668 Berninger, and, per se, constitutes no part of this invention.

Operation

When the pilot's condition lever is in the governing position, as depicted by letter G in Fig. 1, propeller speed will be maintained constant at 1105 r.p.m. If propeller speed should increase, the speed sensitive plunger 87 will move upwardly, thereby connecting the variable pressure chamber 145 of the distributor valve to drain, through passage 67, annular groove 65, ports 63, annular groove 73, ports 69a (Fig. 4) passages 92 and 93, the hollow stud 81 and to the regulator. Accordingly, since the servo chamber 145 is connected to drain the sleeve piston 132 will move downwardly under the urge of constant low pressure in servo chamber 144 so as to apply high pressure fluid from line 42 to the increase pitch line 225 and the increase pitch chambers 16 of the torque units while the decrease pitch chambers 17 are connected to drain through line 226 and line 251. Since the sleeve piston 132 is pivotally connected to one end of the lever, or bellcrank 86, and the other end of the bellcrank 86 is pivotally connected to the sleeve 68, downward movement of the sleeve piston 132 will effect upward movement of the sleeve 68, as viewed in Figure 3, whereas upward movement of the sleeve piston 132 will effect downward movement of the sleeve 68, as viewed in Figure 3 through the bellcrank 86. Downward movement of the distributor valve sleeve piston 132 will effect upward movement of the follow-up sleeve 68 of the speed sensitive valve assembly whereby the connection of variable pressure servo chamber 145 to drain will be interrupted. The follow-up movement of the speed sensitive valve sleeve 68 results in proportionalized governing since the displacement of the distributor valve sleeve piston 132 is proportional to speed error. When propeller speed is reduced to 1105 r.p.m., the foregoing sequence is reversed and the system is returned to an equilibrium condition.

When the speed sensitive plunger, or governor pilot valve, is in the neutral position, that is when the opposing spring and centrifugal forces are in equilibrium and the propeller is rotating at the selected constant speed the land 88 on the plunger 87 covers the ports 69a in the sleeve 68, as shown in Figure 4, so that oil is trapped in the servo chamber 145. The constant low pressure oil supplied to servo chamber 144 continuously urges the sleeve piston 133 downwardly, as viewed in Figure 3, but since the oil is trapped in the servo chamber 145 and at the low pressure is substantially incompressible, the sleeve piston 132 will remain in the neutral position as seen in Figure 3. As aforementioned, when the servo chamber 145 is connected to drain due to upward movement of the plunger 87, the constant low pressure in servo chamber 144 will effect downward movement of the sleeve piston 132. Since the area of the sleeve piston exposed to servo chamber 145 is greater than the area of the sleeve piston exposed to the servo chamber 144, it will be appreciated that if the chamber 145 is subjected to the same low pressure as servo chamber 144, the sleeve piston 132 will move upwardly since the low pressure in chamber 145 acts upon a greater area than the low pressure in the chamber 144.

If propeller speed should fall below 1105 r.p.m., the speed sensitive plunger 87 will move downwardly, as depicted in Fig. 1, thereby connecting the servo chamber 145 to the constant low pressure supply conduit 146 through passage 66, ports 62 and 69, annular groove 90, port 69a, annular groove 73, ports 63, annular groove 65 and passage 67 so as to effect a slight upward movement of the distributor valve sleeve 132. In this instance, the increase pitch chambers 16 of the torque units will be connected to drain through the pressure compensating valve 54, which restricts the rate of drain flow so as to limit the maximum rate of decrease pitch change to 10° per second. As stated hereinbefore, the external twisting moment forces will reduce the pitch position of the propeller when the increase pitch chambers are connected to drain. Due to a positive overlap 135a of land 135 on port 125 (no fluid can flow), low pressure fluid is supplied to the decrease pitch chambers 17 from the loader valve 52 at about 15–25 p.s.i. through line 226. Thus, during normal governing, control is effected by land 136 of the distributor sleeve piston without opening port 125 to the low pressure supply.

When the condition lever 206 is moved to the feathered position, as denoted by letter F, the control ring 204 will be moved to the left, as will the carriage 175, as viewed in Fig. 1. By moving carriage 175 to the left in Fig. 1, the roller 180 will engage the cam surface 181 of the lever 96 and move the plunger 87 upwardly so as to call for an increase in propeller pitch. Inasmuch as the plunger 87 cannot move downwardly when the roller 180 engages cam surface 181, the propeller blades will be moved to the feathered position by application of fluid pressure to the increase pitch chambers while the decrease pitch chambers are connected to drain.

Similarly, if at any time the propeller drives the engine, the solenoid 174 will be energized, thereby effecting movement of the control ring 171 to the left, as viewed in Fig. 1. Movement of the control ring 171 to the left will effect movement of the automatic feathering carriage 198 to the left whereupon the roller 172 will engage the cam surface 173 on the lever 96 and move the plunger 87 upwardly so as to call for an increase in propeller pitch. Since the lever 96 and the plunger 87 cannot move downwardly when the roller 172 engages the cam surface 173, the propeller blades will be moved to the feathered position by the application of pressure fluid to the increase pitch chambers of the torque units while the decrease pitch chambers are connected to drain.

When the condition lever 206 is in the governing range, the roller 180 will effect an hydraulic low pitch stop which prevents the blades from moving below an angle of +5.8°. This hydraulic low pitch stop is effected by the positioning of carriage 175 through lever 184 and pin 185 by the feedback rod 205. If the propeller blades should reach an angle of +5.8° during constant speed propeller operation, the roller 180 will engage the cam surface 181 of the lever 96 so as to reposition the valve plunger 87 in the onspeed condition irrespective of the action of spring 102, which may tend to urge the lever 96 downwardly about fulcrum roller 97.

When the condition lever 206 is moved into the blade angle control range denoted by the letter N in Fig. 1, the position of the plunger 87 will be controlled by the roller 180 under the control of lever 184, as hereinbefore described. Under these conditions flow to the decrease pitch chambers will be supplied from the distributor valve of the governor valve assembly, since the sleeve piston 132 will be moved to overcome the effect of the positive overlap of land 135 with respect to port 125. Inasmuch as the mechanical jittering of fulcrum roller 97 is ineffective when the roller 180 controls the position of the lever 96 and the plunger 87, mechanical jittering of the plunger 87 may be effected through the roller 180 by having a slight axial undulation on the tang 202 on the control ring 204 in the manner similar to that heretofore described in connection with control ring 171.

From the aforegoing, it is apparent that the present invention provides a unitary control valve for a fluid pressure system designed for controlling variable pitch propellers. The unitary control valve assembly controls all functions of the propeller which are essential in modern aircraft.

While the embodiments of the present invention as herein disclosed, constitute preferred forms, it is to be understood that other forms might be adopted.

What is claimed is as follows:

1. A control system for a variable pitch propeller having blades mounted for rotation about their longitudinal axes, said blades being subject to external twisting moment forces which tend to rotate the blades to a predetermined pitch position, and fluid pressure operated servo-motor means operatively connected to said blades for adjusting the pitch position thereof, including in combination, a source of variable high pressure fluid, a source of constant low pressure fluid, a control valve operatively connected with said high and low pressure sources and said servo-motor means for applying high pressure fluid to said servo-motor means to adjust the pitch position of said blades in opposition to said external forces and to supply low pressure fluid to said servo-motor means to adjust the pitch position of said blades in assistance with said external forces, governor means operatively connected with said control valve and responsive to the speed of propeller rotation for actuating said control valve so as to maintain propeller speed substantially constant at a predetermined level by causing said control valve to adjust the pitch position of said propeller blades when the speed of said propeller departs from said predetermined level, and manually operable means connected with said governor means for increasing the speed setting thereof to effect movement of said control valve so as to apply low pressure fluid to said servo-motor means to move said blades to a negative pitch position.

2. A control system for a variable pitch propeller having blades mounted for rotation about their longitudinal axes, said blades being subject to external twisting moment forces which tend to rotate the blades to a predetermined pitch position, and fluid pressure operated servo-motor means operatively connected to said blades for adjusting the pitch position thereof, including in combination, a source of variable high pressure fluid, a source of constant low pressure fluid, a control valve operatively connected with said high and low pressure sources and said servo-motor means for applying high pressure fluid to said servo-motor means to adjust the pitch position of said blades in opposition to said external forces and to supply low pressure fluid to said servo-motor means to adjust the pitch position of said blades in assistance with said external forces, and manually operable means operatively connected with said control valve, said manually operable means being operative in one position for actuating said control valve to apply high pressure fluid to said servo-motor means in opposition to said external forces so as to move the propeller blades to a feathered pitch position, said manually operable means being operative in another position for actuating said control valve to apply low pressure fluid to said servo-motor means in assistance with said external forces to move said blades to a negative pitch position.

3. A control system for a variable pitch propeller having blades mounted for rotation about their longitudinal axes, said blades being subject to external twisting moment forces which tend to rotate the blades to a predetermined pitch position, and fluid pressure operated servo-motor means operatively connected to said blades for adjusting the pitch position thereof, including in combination, a source of variable high pressure fluid, a source of constant low pressure fluid, a control valve operatively connected with said high and low pressure sources and said servo-motor means for applying high pressure fluid to said servo-motor means to adjust the pitch position of said blades in opposition to said external forces and for supplying low pressure fluid to said servo-motor means to adjust the pitch position of said blades in assistance with said external forces, manually operable means operatively connected with said control valve for actuating said control valve to supply pressure fluid to said servo-motor means so as to move said blades to a predetermined pitch position, and feedback means operatively interconnecting said blades and said control valve for repositioning said control valve when said blades have been moved to said predetermined pitch position by said servo-motor means.

4. A control system for a variable pitch propeller having blades mounted for rotation about their longitudinal axes, said blades being subject to external twisting moment forces which tend to rotate the blades to a predetermined pitch position, and fluid pressure operated servo-motor means operatively connected to said blades for adjusting the pitch position thereof, including in combination, a source of variable high pressure fluid, a source of constant low pressure fluid, a control valve having a pair of inlet ports, a pair of outlet ports and a drain port, one of said inlet ports being connected with said high pressure source, the other of said inlet ports being connected to said low pressure source, said outlet ports being connected to opposite sides of said servo-motor means, said control valve being operable to apply high pressure fluid from said one inlet port through one of said outlet ports to said servo-motor means to adjust the pitch position of said blades in opposition to said external forces while the other outlet port is connected to said drain port and operable to supply low pressure fluid from said other inlet port to said other outlet port through side servo-motor means to adjust the pitch position of said blades in assistance with said external forces while said one outlet port is connected to said drain port, and governor means operatively connected with said control valve and responsive to the speed of propeller rotation for actuating said control valve so as to maintain propeller speed substantially constant at a predetermined level by adjusting the pitch position of said blades when the propeller speed departs from said predetermined level.

5. A control system for a variable pitch propeller having blades mounted for rotation about their longitudinal axes, said blades being subject to external twisting moment forces which tend to rotate the blades to a predetermined pitch position, and fluid pressure operated servo-motor means operatively connected to said blades for adjusting the pitch position thereof, including in combination, a source of variable high pressure fluid, a source of constant low pressure fluid, a control valve having a first inlet port connected with said high pressure source, a second inlet port connected with said low pressure source, a drain port, a first outlet port connected with said servo-motor, a second outlet port connected with said servo-motor and a reciprocable piston operable to interconnect said first outlet port with either said first inlet port or said drain port and to interconnect said second outlet port with either said second inlet port or said drain port so as to apply either high pressure fluid to said servo-motor means to adjust the pitch position of said blades in opposition to said external forces or supply low pressure fluid to said servo-motor means to adjust the pitch position of said blades in assistance with said external forces, and means operatively connected with said reciprocable piston for controlling the position thereof so as to control the pitch position of said propeller blades.

6. The combination set forth in claim 5 wherein said reciprocable piston comprises a sleeve having a closed end, wherein said control valve includes a fixed piston disposed within said sleeve and forming a first servo chamber between the closed end of said sleeve and one end of said fixed piston, said control valve having a second servo chamber to which the opposite surface of the closed end of said sleeve is exposed, the area of said end of said sleeve exposed to said first servo chamber being substantially less than the area of said sleeve end exposed to said second servo chamber, passage means connecting said first servo chamber with said source of low pressure fluid, and wherein said control means controls the position of said sleeve piston by varying the pressure potential of fluid in said second servo chamber.

7. The combination set forth in claim 5 wherein said last recited means comprises a centrifugally responsive reciprocable plunger, a centrifugally responsive lever having one end operatively connected to said plunger, a fulcrum support for said lever, and spring means engaging said lever between said fulcrum support and the end of the lever connected with said plunger for opposing movement of said lever and said plunger under the urge of centrifugal force, wherein said reciprocable piston is servo actuated, and passage means connecting said low pressure source with said reciprocable plunger and with said servo actuated piston whereby said reciprocable plunger controls the position of said reciprocable piston.

8. A control system for a variable pitch propeller having blades mounted for rotation about their longitudinal axes, said blades being subject to external twisting moment forces which tend to rotate the blades to a predetermined pitch position, and fluid pressure operated servo motor means operatively connected to said blades for adjusting the pitch position thereof, including in combination, a source of variable high pressure fluid, a source of constant low pressure fluid, control valve means operatively connected with said high and low pressure sources and said servo motor means, said control valve means being operable to apply high pressure fluid to said servo motor means to adjust the pitch position of said blades in opposition to said external forces and operable to supply low pressure fluid to said servo motor means to adjust the pitch position of said blades in assistance with said external forces, and manually operable means connected with said control valve means for actuating said control valve means to apply low pressure fluid to said servo motor means in assistance with said external forces to move said blades to a negative pitch position, said control valve means comprising a valve body having a plurality of bores therein, a reciprocable sleeve piston having a closed end disposed in one of said bores, said sleeve piston controlling the application of high pressure fluid to said servo motor means and the supply of low pressure fluid to said servo motor means, a fixed piston carried by said valve body and disposed within said sleeve piston, a first servo chamber formed between one end of said fixed piston and the inner surface of the closed end of the sleeve piston, passage means in said valve body interconnecting said low pressure source and said first servo chamber for continuously subjecting said first servo chamber to low pressure fluid, a second servo chamber in said valve body to which the outer surface of the closed end of the sleeve piston is exposed, a reciprocable sleeve disposed in a second bore of said valve body, a reciprocable plunger disposed within said valve sleeve, said valve sleeve having a set of pressure inlet ports which are connected to said low pressure source and a set of outlet ports which are connected to said second servo chamber, the area of said sleeve piston exposed to said second servo chamber being substantially greater than the area of said sleeve piston exposed to said first servo chamber, said reciprocable plunger having a land cooperable with the set of outlet ports in said valve sleeve for controlling the application of low pressure fluid to and drain from said second servo chamber to thereby control the position of said sleeve piston, and means interconnecting said sleeve piston and said valve sleeve for effecting a follow-up movement of said valve sleeve with respect to said valve plunger when said valve plunger moves so as to connect the outlet ports of said sleeve and, hence, said second servo chamber either to drain or to said low pressure source, thereby causing movement of said sleeve piston.

9. The combination set forth in claim 8 wherein said control valve means includes a lever, said valve plunger being operatively connected to one end of said lever, said lever and said plunger being centrifugally responsive, a fulcrum support for said lever, and a spring acting upon said lever between said fulcrum support and the connection of said lever with said valve plunger for opposing movement of said lever and said valve plunger under the urge of centrifugal force.

10. The combination set forth in claim 8 wherein said control valve means includes a lever, one end of which is operatively connected to said valve plunger, said lever and said valve plunger being centrifugally responsive, a roller carried by said valve body and supported for limited rolling movement relative to said valve body, said lever engaging said roller whereby said roller constitutes a fulcrum support for said lever, spring means carried by said valve body and engaging said lever between said fulcrum support and the connection between said lever and said valve plunger, and a reciprocable carriage supported by said valve body and engaging said roller for effecting limited rolling movement thereof so as to change the lever ratio and cause pulsating movement of said valve plunger.

11. The combination set forth in claim 8 wherein said control valve means includes a reciprocable jitter plunger which is disposed in a third bore of said valve body, passage means interconnecting said third bore and said second servo chamber, and means for reciprocating said jitter plunger during propeller rotation so as to raise and lower the pressure in said second servo chamber and thereby cause jittering movement of said sleeve piston.

12. The combination set forth in claim 8 wherein said control valve means includes a spring disposed within said second valve body bore and engaging said valve sleeve, said spring urging said valve sleeve outwardly whereby said sleeve piston is moved inwardly through said interconnecting means in the absence of low pressure fluid in said second servo chamber.

13. The combination set forth in claim 8 wherein said control valve means includes a lever having one end operatively connected to said valve plunger, a fulcrum support carried by said valve body for said lever, spring means carried by said valve body and engaging said lever between said fulcrum support and the connection between said lever and said valve plunger, said lever having a cam surface formed thereon adjacent the connection between said lever and said valve plunger, a first reciprocable carriage supported by said valve body and carrying a roller, a second reciprocable carriage supported by said valve body, means connected with said second carriage for manually effecting movement thereof, a third reciprocable carriage supported by said valve body, feedback means interconnecting said third carriage and said propeller blades for effecting movement thereof within a predetermined range of pitch movement of said blades, and a lever having an intermediate portion pivotally connected to said first carriage and opposite ends thereof operatively connected with said second and third carriages whereby movement of said second carriage will effect movement of said first carriage so that said roller will engage said cam surface and adjust the position of said lever and said valve plunger whereby the position of said sleeve piston will be altered so as to call for a selected pitch position of said blades, said third carriage repositioning said first carriage within said predetermined range of pitch movement when the pitch position selected by said manual means has been reached by said propeller blades.

14. The combination set forth in claim 8 wherein said control valve means includes a lever having one end operatively connected to said valve plunger, a fulcrum support carried by said valve body for said lever, spring means carried by said valve body and acting on said lever between said fulcrum support and the connection between said lever and said valve plunger, a servo piston disposed within a third bore of said valve body and engaging said spring, a valve disposed in a fourth bore of said valve body having an inlet port and an outlet port, passage means in said valve body connecting said inlet port with said low pressure source, passage means connecting said outlet port with said servo actuated piston, and manual means to effect movement of said valve so as to interconnect said inlet and outlet ports and thereby subject said piston to low pressure fluid so as to vary the stress of said spring means.

15. The combination set forth in claim 8 wherein said control valve means includes a lever having one end operatively connected to said valve plunger, a fulcrum support carried by said valve body for said lever, spring means carried by said valve body and engaging said lever between said fulcrum support and the connection between said lever and said valve body, said lever having a cam surface formed adjacent one end thereof, a reciprocable carriage supported by said valve body and carrying a roller, and means to effect movement of said carriage so that said roller engages said cam surface so as to effect movement of said lever about said fulcrum support to thereby adjust the position of said valve plunger.

16. A control valve assembly for controlling a fluid pressure system for a variable pitch propeller, including in combination, a valve body having a plurality of valve bores therein, a centrifugally responsive plunger mounted for reciprocable movement within one of said valve bores, a centrifugally responsive lever having one end operatively connected to said valve plunger, a fulcrum support for said lever, spring means engaging said lever between said fulcrum support and the end of the lever connected with said valve plunger for opposing movement of said lever and valve plunger under the urge of centrifugal force, a servo actuated piston disposed in another of said valve bores, means constituting a variable pressure servo chamber in said valve body, said servo actuated piston having a surface exposed to said variable pressure servo chamber, passage means interconnecting said variable servo chamber with said reciprocable plunger and a source of fluid pressure, and means for continuously varying the pressure in said variable pressure servo chamber during propeller rotation independent of said plunger so as to jitter said servo actuated piston.

17. A control valve assembly for controlling a fluid pressure system for a variable pitch propeller, including in combination, fluid pressure developing means, a valve body, a servo actuated member disposed in said valve body having opposed piston surfaces of different areas, means for continuously supplying fluid under pressure from said pressure developing means to the smaller piston surface, means connected with said larger piston surface for controlling the supply and drain of pressure fluid thereto so as to effect movement of said member in opposite directions to increase or decrease propeller pitch, and resilient means operatively associated with said servo actuated member for moving said member to a position calling for an increase in propeller pitch upon failure of the fluid pressure developing means.

18. In a variable pitch propeller having several regimes of propeller speed including constant speed and a manually selected blade angle range, the combination including, fluid pressure operated means for adjusting propeller pitch, a source of fluid under pressure, a servo actutated distributor valve connected between said source and said fluid pressure operated means for controlling the flow of fluid therebetween in the regime of constant speed operation, a governor pilot valve connected between said source of fluid pressure and said servo actuated distributor valve for controlling the position thereot, manually operable means to position said governor pilot valve to select any blade angle in the manually selected blade angle range, and feed-back operated means connected with said propeller for repositioning said governor pilot valve when the selected blade angle has been attained.

19. In a variable pitch propeller having several regimes of propeller operation including constant speed and feathering, the combination including, fluid pressure operated means for adjusting propeller pitch, a source of fluid under pressure, a servo actuated distributor valve connected between said source and said fluid pressure operated means for controlling the flow of fluid therebetween in the regime of constant speed operation, a governor pilot valve connected between said source of fluid pressure and said servo actuated distributor valve for controlling the position thereof, and manually operable means to position said governor pilot valve to effect feathering operation.

20. In a variable pitch propeller having several regimes of propeller operation including constant speed, manually selected blade angle range and feathering, the combination including, fluid pressure operated means for adjusting propeller pitch, a source of fluid under pressure, a servo actuated distributor valve connected between said source and said pitch adjusting means for controlling the flow of fluid therebetween in the constant speed regime so as to maintain propeller speed substantially constant, a governor pilot valve connected between said source of fluid pressure and said servo actuated distributor valve for controlling the position thereof, means to position said governor pilot valve to select any blade angle in the manually selected blade angle range, means to position said governor pilot valve to select feathering operation, and manually operable means to select the desired regime of propeller speed.

21. In a variable pitch propeller having several regimes of propeller operation including constant speed and a manually selected blade angle range, the combination including, fluid pressure operated means for adjusting propeller pitch, a source of fluid under pressure, a servo actuated distributor valve connected between said source and said pitch adjusting means for controlling the flow of fluid therebetween, a governor pilot valve connected between said source of fluid pressure and said servo actuated distributor valve for controlling the position thereof, a governor spring operatively associated with said governor pilot valve, means to adjust the setting of said spring, and manually operable means to select the regime of propeller operation by actuating said last recited means to establish a predetermined spring setting during propeller operation in the constant speed regime and for increasing the speed setting and mechanically positioning said governor pilot valve during operation in the manually selected blade angle range.

22. In a variable pitch propeller having blades movable between reverse and feathering positions, the propeller being operable in regimes of constant speed and a manually selected blade angle range, the combination including, fluid pressure operated means operatively connected to said blades for adjusting the pitch position thereof, a source of fluid under pressure, a servo actuated distributor valve connected between said source and said pitch adjusting means for controlling the flow of fluid therebetween, a governor pilot valve connected between said source of fluid pressure and said servo actuated distributor valve for controlling the position thereof, a spring associated with said governor pilot valve, means for adjusting the setting of said spring to obtain a first setting thereof during propeller operation in the constant speed regime and a second, higher setting thereof during operation in the manually selected blade angle range, manually operable means for selecting the regime of propeller operation including means for manually positioning said governor pilot valve during operation in the manually selected blade angle range, and feed-back means connected between said blades and said governor pilot valve for repositioning the same when the selected blade angle has been attained.

References Cited in the file of this patent

UNITED STATES PATENTS

| | | |
|---|---|---|
| 2,338,483 | Beebe | Jan. 4, 1944 |
| 2,361,954 | Martin | Nov. 7, 1944 |
| 2,407,791 | Martin et al. | Sept. 17, 1946 |
| 2,781,856 | Danvers et al. | Feb. 19, 1957 |